United States Patent
Hughes

(10) Patent No.: US 6,891,794 B1
(45) Date of Patent: May 10, 2005

(54) SYSTEM AND METHOD FOR BANDWIDTH PROTECTION IN A PACKET NETWORK

(75) Inventor: David A. Hughes, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/470,685

(22) Filed: Dec. 23, 1999

(51) Int. Cl.[7] .......................... G01R 31/08; H04L 12/28
(52) U.S. Cl. ...................... 370/225; 370/389; 370/420; 370/395.1
(58) Field of Search ........................ 370/216, 217, 370/225, 227, 228, 238.1, 242, 244, 245, 400, 395.1, 395.21, 395.41, 468, 419, 420, 396, 397; 709/224–227, 235, 238, 239, 241

(56) References Cited

U.S. PATENT DOCUMENTS

| | | | | |
|---|---|---|---|---|
| 5,452,293 A | * | 9/1995 | Wilkinson et al. | 370/395.213 |
| 5,608,733 A | * | 3/1997 | Vallee et al. | 370/394 |
| 5,629,928 A | * | 5/1997 | Calvignac et al. | 370/237 |
| 5,835,494 A | | 11/1998 | Hughes et al. | |
| 5,898,691 A | | 4/1999 | Liu | |
| 5,959,972 A | * | 9/1999 | Hamami | 370/228 |
| 6,034,945 A | | 3/2000 | Hughes et al. | |
| 6,097,722 A | * | 8/2000 | Graham et al. | 370/395 |
| 6,185,222 B1 | | 2/2001 | Hughes | |
| 6,201,813 B1 | | 3/2001 | Klausmeier et al. | |
| 6,256,309 B1 | | 7/2001 | Daley et al. | |
| 6,262,986 B1 | * | 7/2001 | Oba et al. | 370/399 |
| 6,272,107 B1 | * | 8/2001 | Rochberger et al. | 370/216 |
| 6,356,622 B1 | * | 3/2002 | Hassell et al. | 379/1.01 |
| 6,430,191 B1 | | 8/2002 | Klausmeier et al. | |
| 6,434,612 B1 | | 8/2002 | Hughes et al. | |
| 6,477,174 B1 | | 11/2002 | Dooley et al. | |
| 6,526,060 B1 | | 2/2003 | Hughes et al. | |
| 6,538,988 B1 | * | 3/2003 | Natarajan et al. | 370/216 |

* cited by examiner

*Primary Examiner*—Hanh Nguyen
(74) *Attorney, Agent, or Firm*—Blakely, Sokoloff, Taylor & Zafman LLP

(57) ABSTRACT

A system and method for protecting a connection-oriented network by maintaining guaranteed bandwidth and quality of service for each connection of the network. The system comprises two or more communication links located within the network, a transmitter switch coupled to one end of each link for transmitting distinct data along each link, and a receiver switch coupled to the other end of each link for receiving the distinct data. The system further provides that the distinct data transmitted along any one link may be switched and transmitted along the other links when a failure is detected on that one link.

61 Claims, 8 Drawing Sheets

SYSTEM AND METHOD FOR BANDWIDTH PROTECTION IN A PACKET NETWORK

FIELD OF THE INVENTION

The present invention relates generally to telecommunication systems, and, more particularly, to a system and method for providing guaranteed bandwidth protection and for maintaining quality of service in a connection-oriented network, such as an Asynchronous Transfer Mode (ATM) network.

BACKGROUND OF THE INVENTION

ATM is a switching and multiplexing technique designed for transmitting digital information, such as data, video, and voice, at high speed, with low delay, over a telecommunications network. The ATM network includes a number of switching nodes coupled through communication links. In the ATM network, bandwidth capacity is allocated to fixed-sized units named "cells." The communication links transport the cells from a switching node to another. These communication links can support many virtual connections, also named channels, between the switching nodes. The virtual connections, such as a Virtual Channel Connection (VCC), assure the flow and delivery of information contained in the cells.

Each cell contains a cell header and cell data. The cell header includes information necessary to identify the destination of that cell. The components of the cell header include, among other things, a Virtual Channel Identifier (VCI) and a Virtual Path Identifier (VPI), for collectively identifying an ATM connection for that particular cell, and a Payload Type Identifier (PTI), for indicating whether the cell is sent from one user to another, whether cell data refers to administration or management traffic, and whether congestion is present within the network.

The ATM Forum, which is a user and vendor group establishing ATM standards, has also defined several ATM service categories, used in characterization of a virtual connection. For example, there are 16 quality of service categories, among them categories such as (1) a Constant Bit Rate (CBR), which supports a constant or guaranteed rate to transport services, such as video or voice, as well as circuit emulation, which requires rigorous timing control and performance parameters; (2) a Variable Bit Rate (VBR), real time and non real time, which supports variable bit rate data traffic with average and peak traffic parameters; (3) an Available Bit Rate (ABR), which supports feedback to control the source rate in response to changed characteristics in the network; and (4) an Unspecified Bit Rate (UBR).

FIG. 1a illustrates a prior art ATM network 100, typically including several network nodes 110 connected through single communication links 120. Typically, nodes 110 are located in the middle of the network 100, but may also be located at the edges. The network 100 is a data transmission network with guaranteed bandwidth and quality of service. Users 130 access the network 100 and connect to the nodes 110 via similar links 120. Generally, the illustrated communication links support multiple virtual connections. If one link fails, the cells of information transmitted along the virtual connections supported by that link are re-routed using other links in order to avoid extensive loss of data. However, the process of switching and re-routing is time consuming, typically a few seconds, and some loss of data is inevitable.

Attempts made to design a faster switching system for voice communications, preferably under 50 ms, have resulted in the development of an automatic protection switching (APS) system. As illustrated in FIG. 1b, in the ATM network 100, parallel links 122, 124 connect the nodes 110 and are used to transmit duplicate information between the nodes 110 and to ensure fast and reliable data transmission. Link 122 is called an "active" link, while link 124 is a "stand-by" link. Because the same information is transmitted on both links 122, 124, the switching node 110 located at the receiving end can choose either link to receive the transmitted information. For example, if the active link 122 fails, the stand-by link 124 can deliver the same information to the switching node. This APS configuration can be implemented, for example, with the SONET/SDH standards, and can also be used to transport data packets instead of voice communications.

Although the APS system increases the reliability of ATM networks, the duplicated data sent on both links 122, 124 reduces the bandwidth in half, resulting in a waste of bandwidth.

SUMMARY OF THE INVENTION

A system and method are disclosed for protecting a network. The system comprises a plurality of links located in the network. A transmitter switch, coupled to the first end of each link of the plurality of links, is provided for transmitting distinct data along each link. A receiver switch, coupled to the second end of each link, is provided for receiving the distinct data from each link. Distinct data transmitted along one link may be switched to another link when a failure is detected on the one link.

Other features and advantages of the present invention will be apparent from the accompanying drawings, and from the detailed description, which follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

According to embodiments described herein, the system includes two or more communication links located within a connection-oriented network. A transmitter switch is coupled to one end of the links, while a receiver switch is coupled to the other end. The transmitter switch receives cells containing information, classifies them according to each cell's header information, and stores them within queuing buffer sets. A multiplexer transfers distinct stored cells to each communication link for transmission. By sending distinct data along each link, the system avoids a reduction in bandwidth, experienced in systems which send duplicated data along multiple links.

If a failure is detected on a particular link, the multiplexer can switch the traffic of cells along that link to another link, thereby increasing the reliability of the network. By switching the cells to a fully operational link, the system maintains the guaranteed bandwidth and quality of service for each connection transmitted between the two switches.

The following discussion is presented in the context of an Asynchronous Transfer Mode (ATM) network. It should be understood that the present invention is not limited to ATM networks and may be implemented with other types of networks, such as Frame Relay networks.

Figures 1A, 1B:
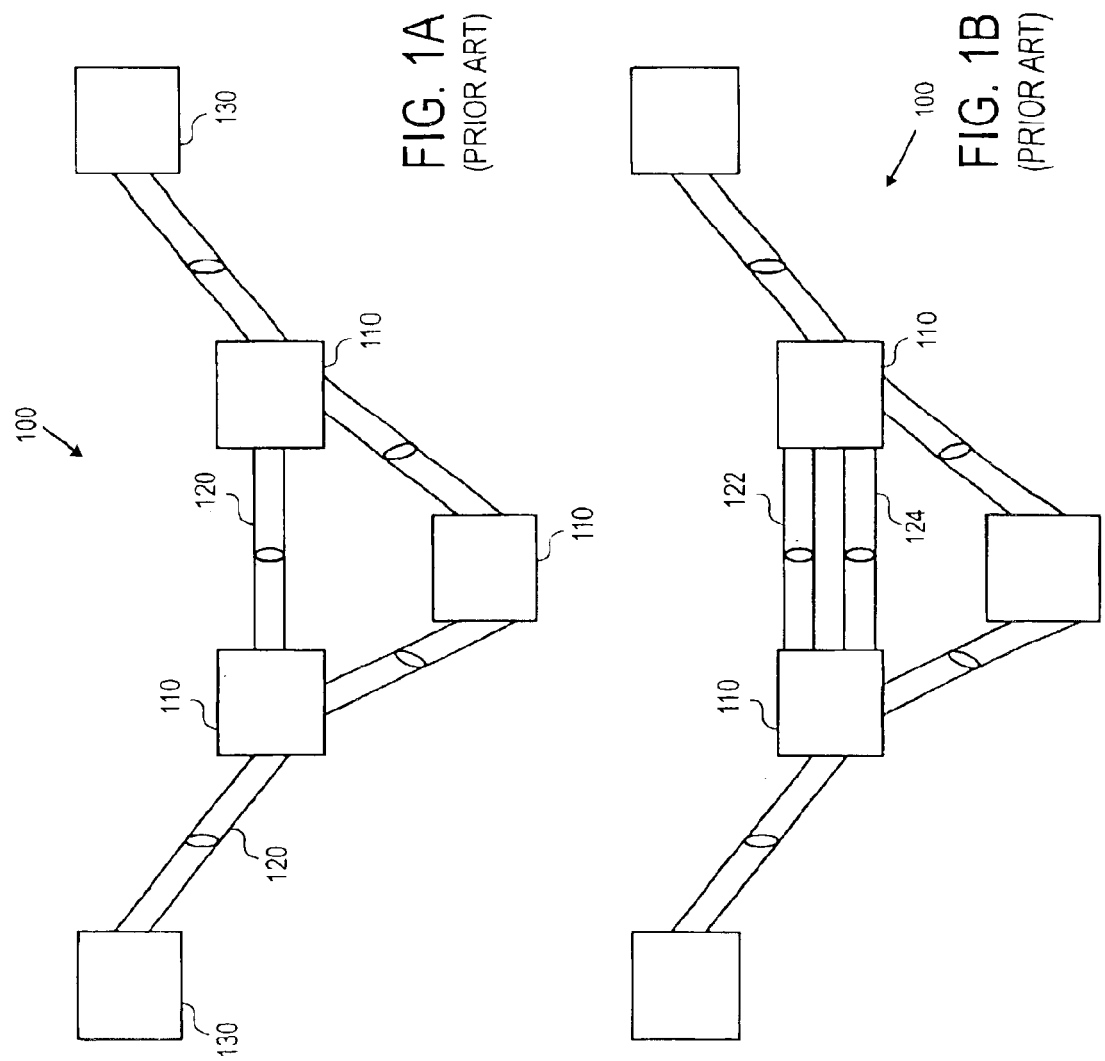
FIG. 1a shows an exemplary prior art network.
FIG. 1b shows a prior art network with an example of an Automatic Protection Switching (APS) system.
Figure 2:
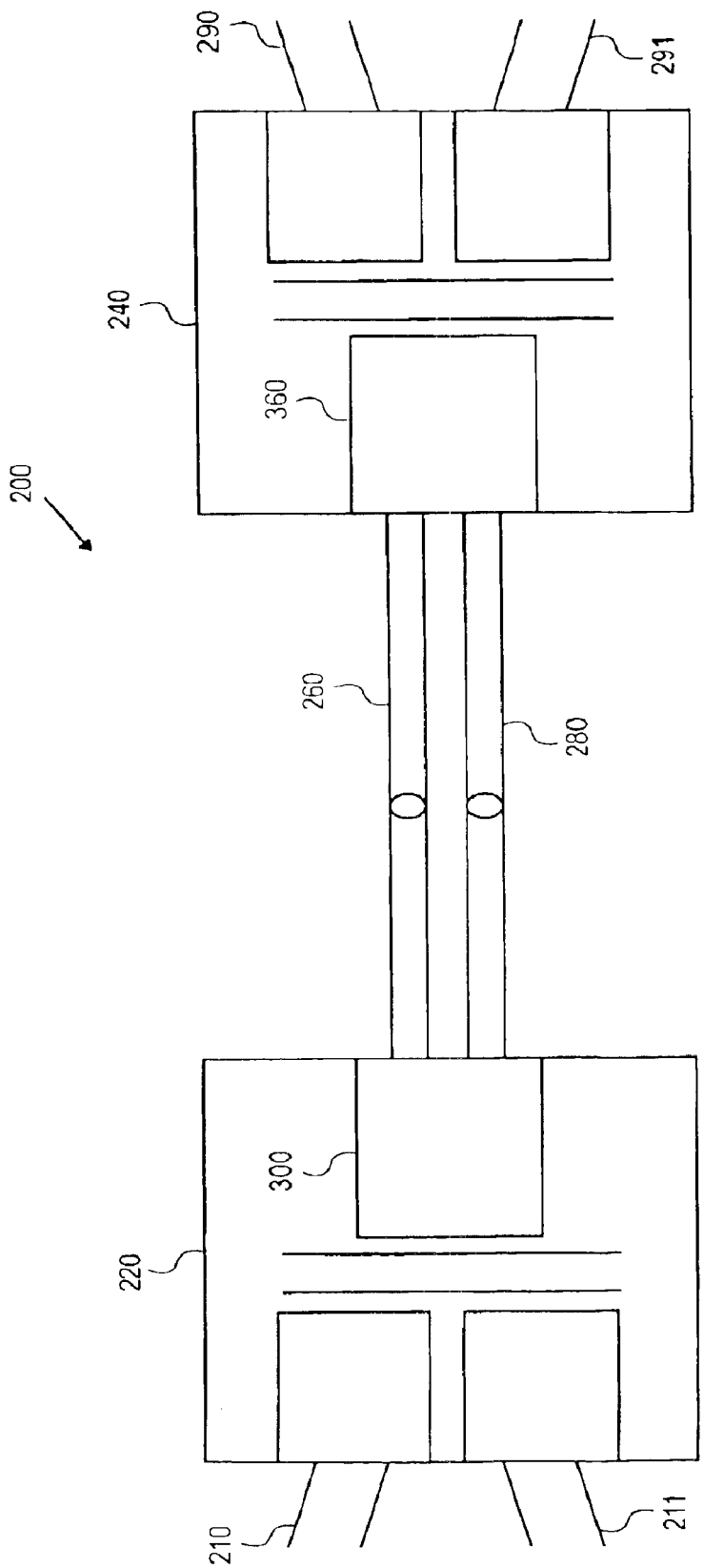
FIG. 2 is a block diagram of one embodiment of a system with a transmitter switch and a receiver switch, each having one line card coupled to both communication links.

FIG. 2 illustrates one embodiment of the present invention. A system 200, residing in an ATM network (not shown) comprises a transmitter switch 220 coupled to a receiver switch 240 via communication links 260 and 280. The transmitter switch 220 receives data on input links 210 and 211 and transfers the data to a transmitter line card 300 described in detail below. The transmitter line card 300 is coupled to both communication links 260 and 280 and facilitates the transmission of data along links 260, 280 to the receiver switch 240. The receiver switch 240 includes a receiver line card 360, which will also be described in detail below. The receiver line card 360 is coupled to links 260, 280 and receives data transmitted along those links. Finally, within the receiver switch 240, data is transferred from the receiver line card 360 to output links 290, 291 for further processing. Those skilled in the art will recognize that the exemplary environment illustrated in FIG. 2 is not intended to limit the present invention. Indeed, those skilled in the art will recognize that other alternative hardware environments may be used without departing from the scope of the present invention. For example, in one embodiment, the system is a full duplex design, wherein a single line card includes both transmitting and receiving modes. The transmitter line card 300 and the receiver line card 360 will now be described in further detail.

Figure 3:
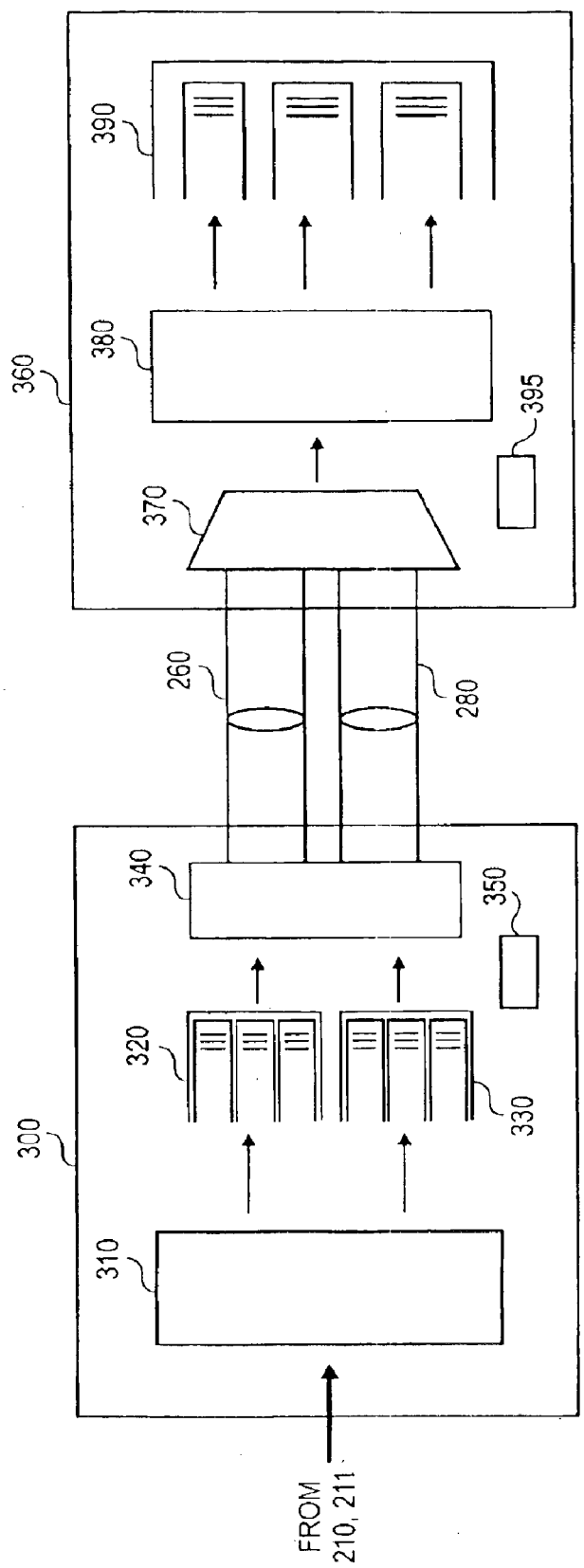
FIG. 3 is a block diagram of the line cards shown in FIG. 2.

According to FIG. 3, the transmitter line card 300 receives data from input links 210 and 211. Data received by line card 300 includes individual cells of information, which are transmitted through virtual connections (VCs) established in the ATM network. It is known in the art that each communication link in the ATM network may carry many different VCs. The line card 300 further comprises a classifier device 310, two sets of queuing buffers 320 and 330, a multiplexing device 340, and a processor 350.

Each queuing buffer set 320, 330 further includes multiple quality of service (QoS) queues, for example a variable bit rate (VBR), a constant bit rate (CBR), an available bit rate (ABR), and an unspecified bit rate (UBR) service queues. In addition, there may be per connection queues. Although the figure only illustrates three quality of service queues, the number of queues in each buffer set may be much greater. Although one embodiment includes two queuing buffer sets for the two links 260, 280, for alternative embodiments multiple queuing buffer sets, corresponding to multiple communication links, may be used. Alternatively, all queuing buffer sets could be stored in a single memory system. The queuing buffer sets 320, 330 are coupled to the multiplexing device 340, which in turn is coupled to the communication links 260 and 280.

The transmitter switch 220 receives a VC setup request, for example from an adjacent node or network management system, and assigns each VC to one of the buffer sets. The switch 220 also programs this information into the classifier 310. When the classifier 310 receives the cells associated with the VCs from input links 210, 211, it classifies the cells based on each cell's header information, such as their virtual path identifier (VPI) and virtual channel identifier (VCI), and transfers the classified cells to either one of the queuing buffer sets 320, 330, based on the VPI and VCI of each cell. In particular, in order to determine which queuing buffer set to receive each particular cell, the classifier 310 examines the VPI and VCI of each cell and generates a logical connection number (LCN), which correlates the VPI/VCI of each cell with a VCI, VPI, and port used to transfer the cell. The classifier 310 stores all cells associated with a VC, having the same LCN, and correspondingly the same VPI and VCI, to the same queuing buffer set.

Figure 4A:
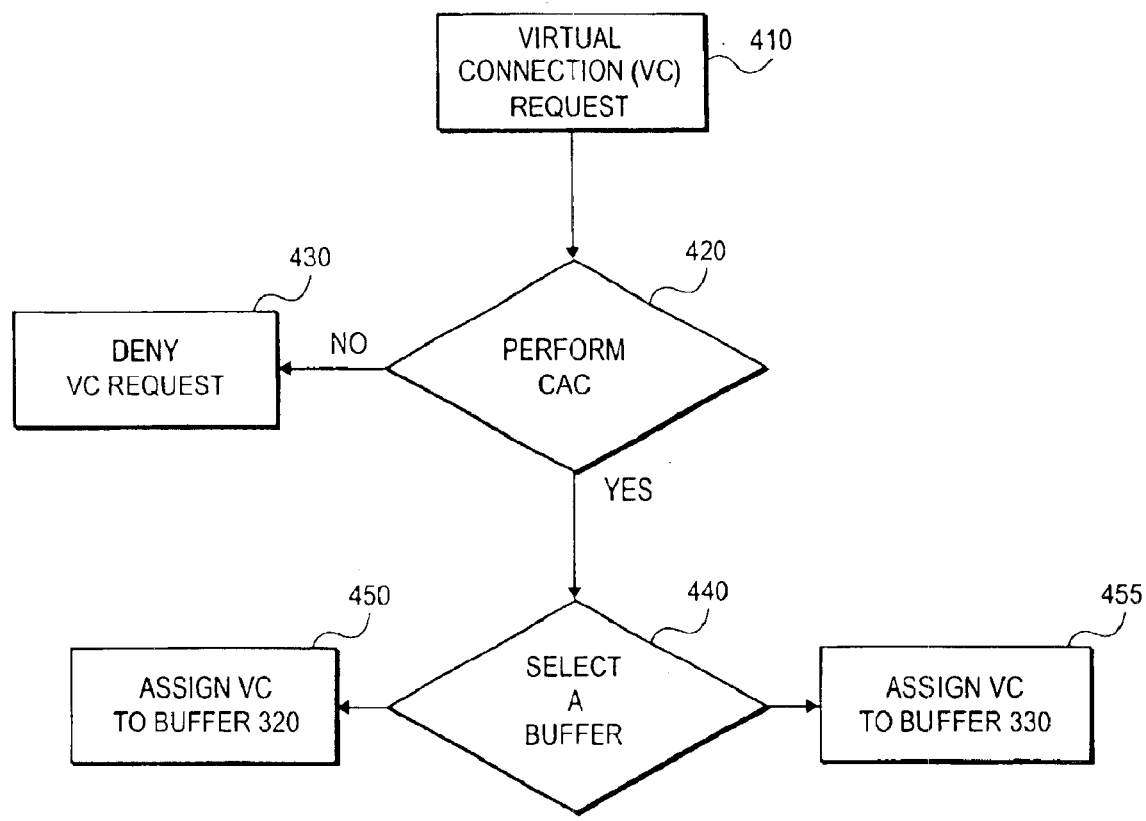
FIG. 4a is a flowchart representing the process of assigning virtual connections to appropriate buffer sets.

FIG. 4a is a flowchart representing a detailed process of assigning VCs to appropriate buffer sets. The process of assigning VCs is performed in accordance with a connection admission control (CAC) process described in further detail below.

As shown in the flowchart of FIG. 4a, at step 410, the transmitter switch 220 shown in FIG. 2 receives a VC request. The request may originate from a user (not shown), from a router processor (not shown) coupled to multiple transmitter switches, from a network operator's operation systems (not shown), or from any other entity within the ATM network. At step 420, the transmitter switch 220 performs a CAC process to determine whether the communication links can accommodate the VC request. In the preferred embodiment, the transmitter switch 220 maintains a CAC process over the link pair 260, 280 to determine whether new data may be transmitted along those links. The CAC process ensures that the QoS objectives of all VCs transmitted on both links 260, 280 can be met, even if a failure of either links is detected. If links 260, 280 are different in size and the larger link fails, the CAC process must ensure that the QoS objectives can be met when all VCs are re-routed along the smaller link. In one specific example, the transmitter switch 220 determines the equivalent bandwidth (EBW) required to meet the QoS objectives of the requested VC. If the sum of the EBW of all existing VCs on both links 260, 280, including the EBW of the requested connection, is less than the total bandwidth of the smaller link, assuming links 260, 280 are different in size, then the VC request is accepted. Otherwise, the VC request is denied at step 430.

If the VC request is accepted, at the next step 440, the switch 220 must select one of the queuing buffer sets 320 and 330 to assign the VC. For one embodiment, the switch 220 assigns the VCs by programming a classifier lookup table. For one embodiment, the switch 220 performs the selection according to a load balancing procedure. During this procedure, the switch 220 measures the amount of data transmitted by each queuing buffer set in a predetermined period of time and assigns the VC to the buffer set having the higher measured amount of transmitted data-i.e., the lower amount of data stored. For example, the switch 220, in trying to maintain the total bandwidth of all VCs assigned to each buffer set approximately equal, assigns the VC request to the buffer set having the lower total bandwidth. For alternative embodiments, alternate procedures may be used in the process of selecting a queuing buffer set, such as a round robin procedure, where even and odd numbered VCs are sent to separate queuing buffer sets, or a random selection. As a result of the operation performed at step 440, the VC is assigned either to buffer set 320, at step 450, or in buffer set 330, at step 455.

Figure 4B:
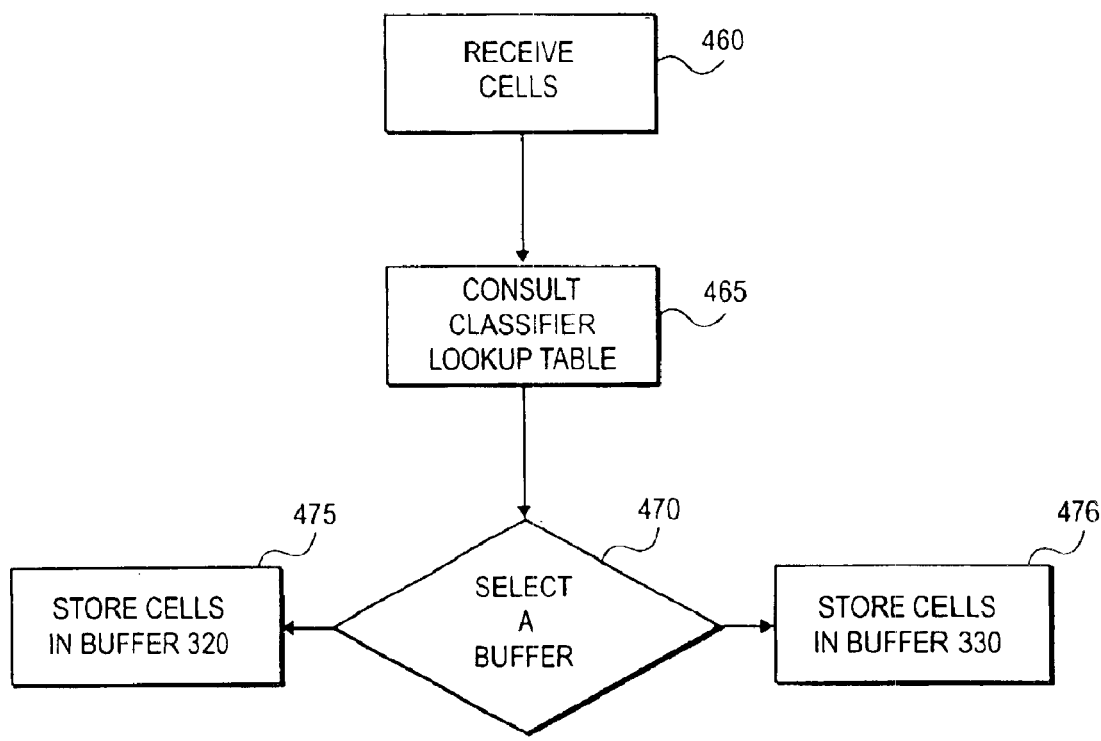
FIG. 4b is a flowchart representing the process of storing cells in designated buffer sets.

FIG. 4b is a flowchart representing a detailed process of storing cells in designated buffer sets. As shown in FIG. 4b, the classifier 310 receives the cells at step 460. At step 465, the classifier 310 consults the programmed classifier lookup table to determine the buffer set where the cells are to be stored. Based on the lookup table, at step 470, the classifier 310 selects a buffer set for the cells associated with each particular VC, storing the cells either in buffer set 320, at step 475, or in buffer set 330, at step 476.

Figure 4C:
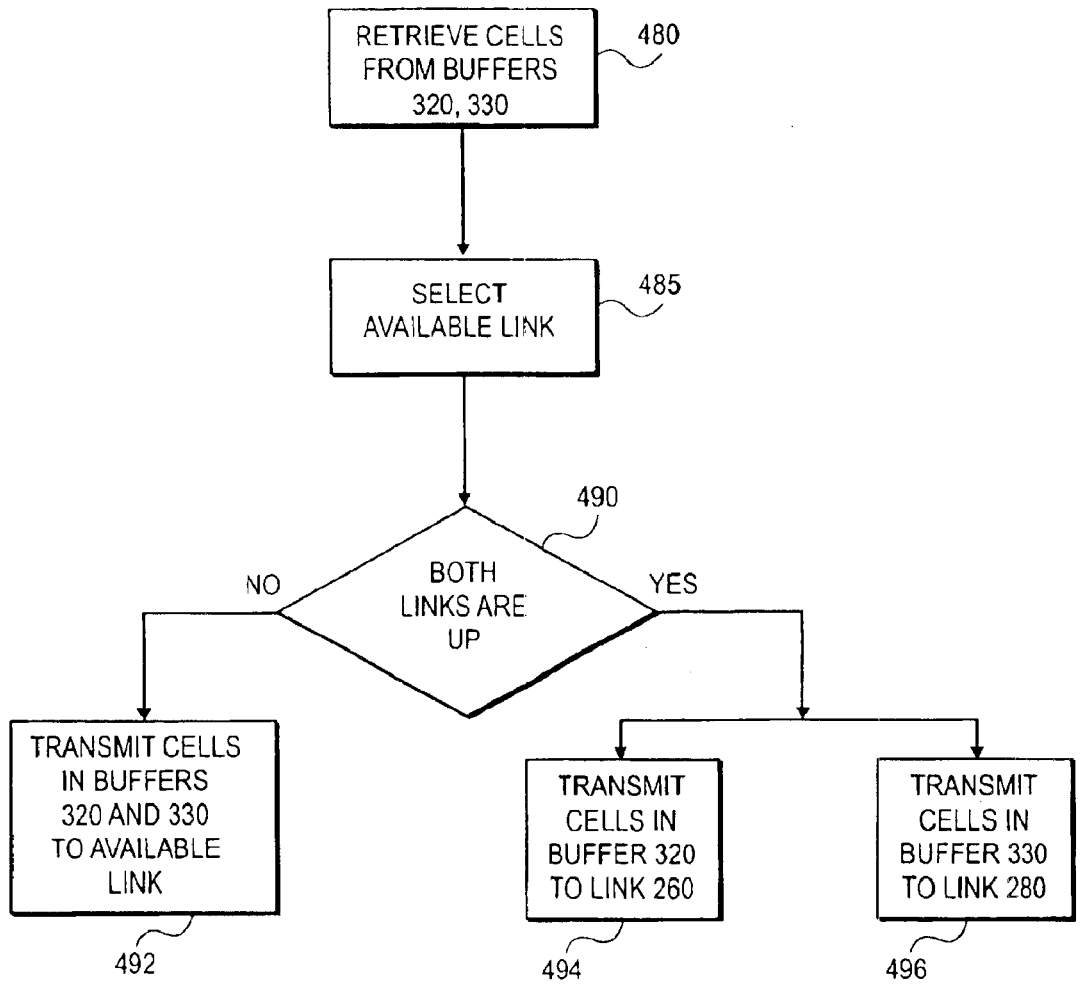
FIG. 4c is a flowchart representing the process of selecting a communication link.

FIG. 4c is a flowchart representing a detailed process of selecting a communication link. For illustrative purposes, the flowchart shows the selection of a communication link in a system including two links. The flowchart, however, may be applicable to systems containing multiple communication links.

As shown in the flowchart of FIG. 4c, at step 480, the cells stored in buffer sets 320, 330 are retrieved. A selection of the link available to carry the cells is performed at step 485. Assuming both links are up and available, at step 494, the cells associated with VCs assigned to buffer set 320 are transmitted through multiplexing device 340 along link 260. At the same time, if both links are available, the cells associated with VCs assigned to buffer set 330 are transmitted along link 280 at step 496. In case of a link failure, the cells stored within both buffers sets 320, 330 are transmitted to the available link at step 492.

Referring back to FIG. 3, the multiplexing device 340 allocates the cells stored within the queuing buffer sets 320, 330 to either link 260 or link 280. For this embodiment, when both links are available, the cells stored in buffer set 320 are selectively sent along link 260, while the cells stored in buffer set 330 are selectively sent along link 280. Multiplexing device 340, however, has the capability to switch the flow of cells from one link to the other based on information received from processor 350. The processor 350 is connected to both links 260, 280 and detects any failure on those links. If a failure is detected, the processor 350 accesses the multiplexing device 340 and reprograms it to switch the cells from the failing link. For example, if a failure is detected on link 260, the multiplexing device 340 switches the cells transmitted along link 260, previously stored in buffer set 320, to link 280. Therefore, following the switch, link 280 will carry cells coming from both queuing buffer sets 320 and 330. If a failure is detected on link 280, cells transmitted along link 280 are switched in a similar fashion to link 260, to be transmitted together with the cells already carried by link 260.

The receiver line card 360 shown in FIG. 3 receives the cells transmitted along both links 260 and 280, or along any one of the links in case of failure of the other. The receiver line card 360 further comprises a multiplexing device 370, a classifier device 380 coupled to the multiplexer 370, a queuing engine 390 containing multiple queues, and a processor 395 connected to both links 260, 280.

The multiplexing device 370 receives and merges the transmitted cells and forwards the merged cells to the classifier 380. The classifier 380 classifies the cells based on the VPI and VCI of each cell and selects a LCN that is inserted into the cell header in a LCN field and is used for further storing of the cell. The classifier 380 then sends the classified cells to the queuing engine 390.

The cells are classified irrespective of the link that carried them. The cells having the same VPI, VCI, and LCN are stored in the same queue within the queuing engine 390. Additionally, each queue stores the cells in the order they are received, thereby maintaining the order of the initial VCs of the communication. Processor 395 is provided to monitor both links 260 and 280 and to detect any link failure that cannot be detected by processor 350 within the transmitter line card 300. When a failure is detected, processor 395 signals the failure to processor 350 and prompts it to reprogram the multiplexing device 340.

Figure 5:
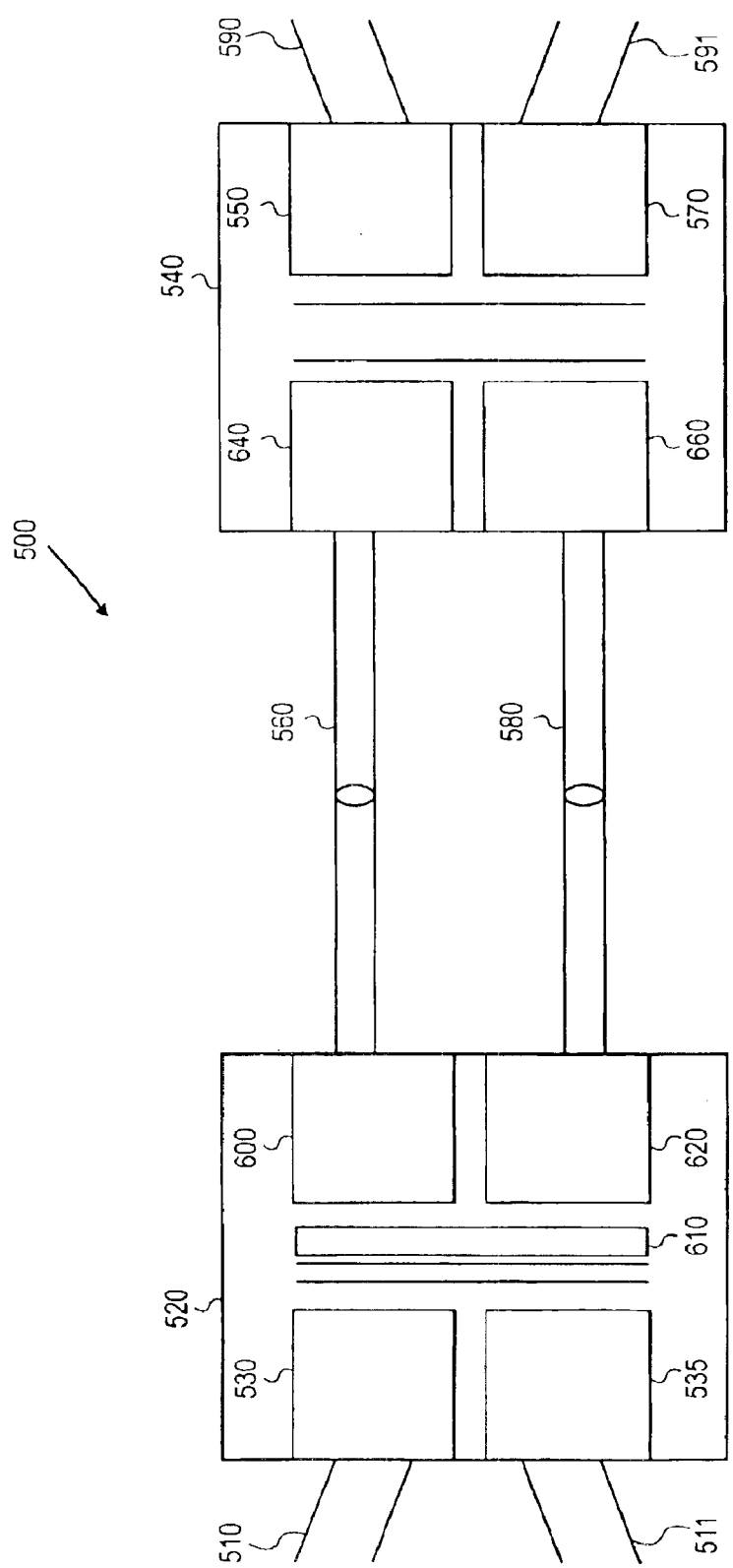
FIG. 5 is a block diagram of another embodiment of a system with a transmitter switch and a receiver switch, each having one line card coupled to each communication link.

FIG. 5 illustrates another embodiment of the present invention. System 500, residing in an ATM network (not shown), comprises a transmitter switch 520 coupled to a receiver switch 540 via communication links 560 and 580. Data is received on input links 510 and 511 and is forwarded to a switching fabric 610 having multicast capability through input line cards 530 and 535, and further to transmitter line cards 600 and 620 using the multicast capability. The transmitter line cards 600, 620 are described in detail below. The transmitter line card 600 is coupled to communication link 560, while the transmitter line card 620 is coupled to link 580, both line cards facilitating the transmission of data along links 560, 580 to the receiver switch 540. The receiver switch 540 includes receiver line cards 640, 660, which will also be described in detail below. The receiver line card 640 is coupled to link 560, while receiver line card 660 is coupled to link 580, both line cards receiving data transmitted along those links. Finally, within the receiver switch 540, data is transferred from the receiver line cards 640, 660 to output line cards 550 and 570 and further to output links 590, 591. The exemplary environment illustrated in FIG. 5 is not intended to limit the present invention. Alternative hardware environments may be used without departing from the scope of the present invention. The transmitter line cards 600, 620 and the receiver line cards 640, 660 will now be described in further detail.

Figure 6:
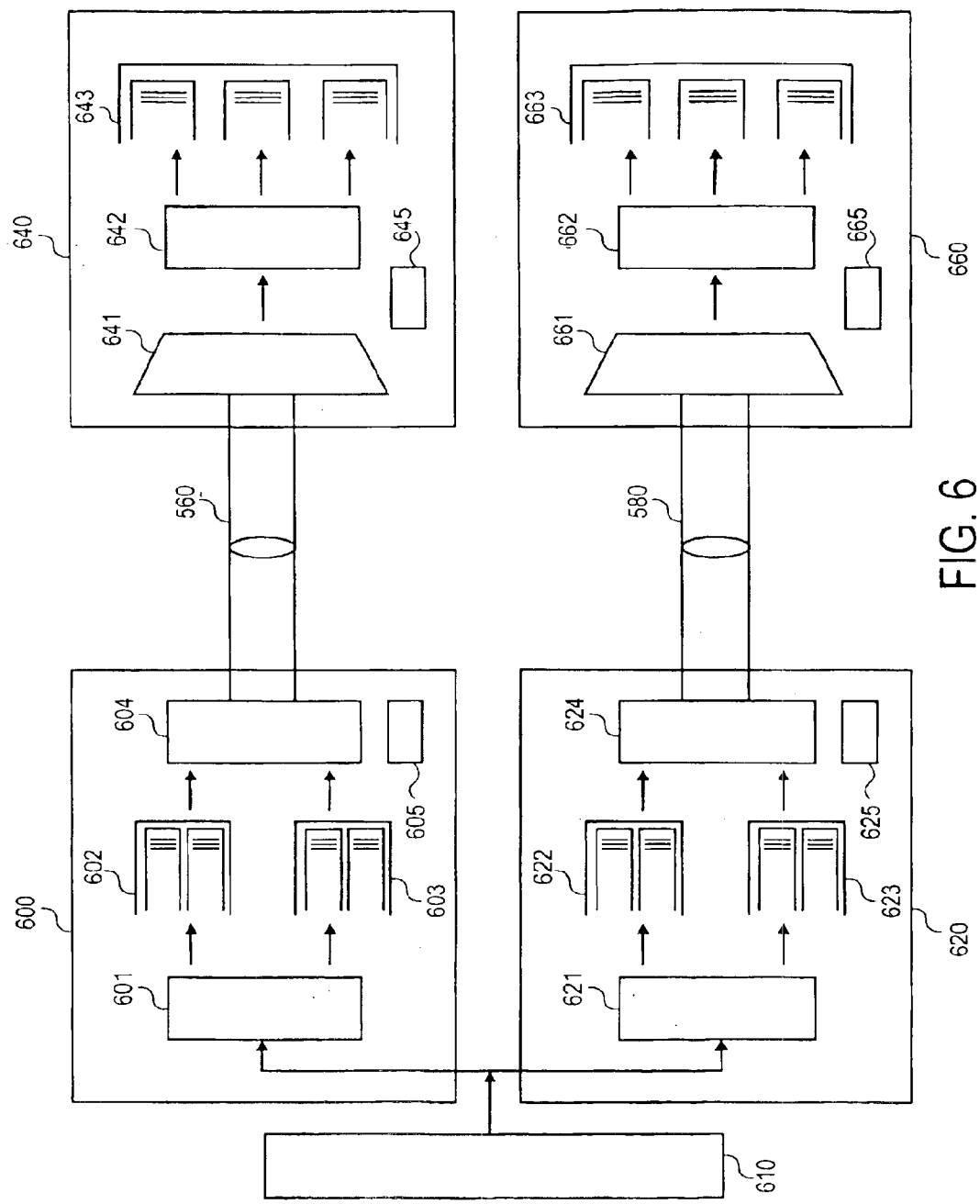
FIG. 6 is a block diagram of the line cards shown in FIG. 4.

As illustrated in FIG. 6, the transmitter line cards 600, 620 are similar in architecture and functionality to the transmitter line card 300 shown in FIG. 3 and described in detail above. Transmitter line cards 600, 620 include (1) classifier devices 601 and 621 respectively, for classifying the information cells; (2) queuing buffer sets 602, 603, and 622, 623 respectively, for storing the classified cells in multiple queues; and (3) multiplexing devices 604 and 624 respectively, for allocating the cells stored within the buffers to the respective links.

Referring also to FIG. 6, the receiver line cards 640, 660 are similar in architecture and functionality to the receiver line card 360 shown in FIG. 3 and described in detail above. Receiver line card 640 is coupled to link 560 and receives cells transmitted along link 560, while the receiver line card 660 is coupled to link 580 and receives cells transmitted along link 580. Similar to line card 360 of FIG. 3, receiver line cards 640, 660 include (1) multiplexing devices 641 and 661 respectively, for receiving and merging the transmitted cells; (2) classifier devices 642 and 662 respectively, for classifying the cells sent by the multiplexing devices; (3) queuing engines 643 and 663 respectively, for storing in multiple queues the cells forwarded by the classifier devices; and (4) processors 645 and 665 respectively for monitoring the receiver line cards 640, 660 and their respective links.

The switching fabric 610 is provided to receive data from input links 510, 511, and to forward the information to both transmitter line cards 600, 620. For one embodiment, the multicast capability of the switching fabric 610 duplicates data received from links 510, 511, forwarding the same information to each line card 600, 620. When both links are active, the multiplexing device 604 within line card 600 is coupled to link 560 and forwards the cells stored in buffer set 602 to link 560 for transmission. At the same time, the multiplexing device 604 routes the cells stored in buffer set 603 to a disposal bin (not shown). The multiplexing device 624 within line card 620 is coupled to link 580 and forwards the cells stored in buffer set 623 to link 580 for transmission, while sending the cells stored in buffer set 622 to the disposal bin. Because data is duplicated, the cells stored in buffer sets 602 and 622, as well as the cells stored in buffer sets 603 and 623, are identical. Therefore, assuming that both links 560 and 580 are functional, entire data received along links 510, 511 is carried and delivered to the receiver line cards 640 and 660.

The multiplexing devices 604, 624 can switch the flow of cells based on information received from processors 605 and 625 respectively. Processor 605 communicates with processor 625, both being designed to monitor their respective transmitter line cards and respective links. For example, if a failure is detected on link 560 or within the transmitter line card 600, processor 605 sends a signal to processor 625, which reprograms the multiplexing device 624 to switch the cells stored in buffer set 622 from the disposal bin to link 580. Similarly, if a failure is detected on link 580 or within the transmitter line card 620, processor 625 instructs processor 605 to switch the cells stored in buffer set 603 from the disposal bin to link 560.

On the receiving end, processor 645 within the receiver line card 640 communicates with processor 665 within line card 660 and with processor 605 within the transmitter line card 600, while processor 665 is connected to processor 625 within transmitter line card 620. If a failure is detected on link 560, processor 645 sends a signal to processor 665, instructing it to communicate with processor 625 to direct the multiplexing device 624 to switch the cells stored in buffer set 622 from the disposal bin to link 580. If a failure is detected within the receiver line card 640, in addition to the previous task, processor 645 also instructs processor 605 to reprogram the multiplexing device 604 to stop all cells from being transmitted along link 560, i.e. to switch cells stored in buffer set 602 from link 560 to the disposal bin. Conversely, failures on link 580 or within receiver line card 660 are treated in a similar fashion by the corresponding processors.

Once received and stored in the queues within the queuing engines 643 and 663, cells pertaining to the same VC are merged within the receiver switch 540 and forwarded to output line cards 550 and 570 shown in FIG. 5. Each output line card 550, 570 includes a classifier device (not shown), which receives cells from both receiver line cards 640 and 660 and classifies them irrespective of their originating line card. Each output line card 550, 570 further includes a processor (not shown) connected to processors 645 and 665 within the receiver line cards 640, 660. Because the classifier devices classify the cells irrespective of their originating receiver line card, the functionality of the entire system 500 is not affected by the failure of any links or line cards. If, for example, a failure is detected within receiver line card 640, but cells are still transmitted along link 560, although processor 605 has been advised to stop traffic on link 560, processor 645 instructs the processors within the output line cards 550, 570 to reprogram the corresponding classifier devices to stop receiving cells from receiver line card 640 and to select line card 660 as supplier of cells. Any failure within any other line card can be similarly solved.

For another embodiment of the present invention, the switching fabric 610 does not replicate cells. The switching fabric 610 receives data from input links 510, 511, and forwards distinct data to each transmitter line card 600 and 620. The cells forwarded to line card 600 are classified and stored in buffer set 602 for transmission along link 560, while the cells forwarded to line card 620 are classified and stored in buffer set 623 for transmission along link 580. Buffer sets 603 and 622 remain empty and no cells are routed to the disposal bin. In the event of a link or card failure, input line cards 530 and 535 in FIG. 5 can be instructed to reroute all traffic to the still functional card or link. For example, if a failure is detected on link 560 or within the transmitter line card 600, the input line cards 530 and 535 request that the switching fabric 610 stop sending traffic to line card 600 and instead forward all data intended for line card 600 to line card 620. The switching fabric 610 may be provided with a lookup table to redirect the cells. Alternatively, the input line cards 530 and 535 may be made capable to change the destination card address of each cell intended for line card 600. As a result, data stored in both buffer sets 622 and 623 is transmitted along link 580. All other operations involving other components of the system 500 are similar to the ones discussed above.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system for protecting a network comprising:

a plurality of links located in said network;

a transmitter switch comprising a transmitter line card coupled to a first end of each link of said plurality of links, for transmitting distinct data along each link of said plurality of links before a failure is detected on one of said plurality of links; and a receiver switch, coupled to a second end of each link of said plurality of links, for receiving said distinct data from each link of said plurality of links;

wherein said distinct data transmitted along said one link of said plurality of links is switched to another link of said plurality of links when the failure is detected on said one link, wherein said distinct data transmitted along each link of said plurality of links comprises cells, and wherein said transmitter line card further comprises a transmitter classifier module for classifying said cells transmitted along each link of said plurality of links, a plurality of transmitter queuing buffers coupled to said classifier module, for receiving and storing said cells, and a transmitter multiplexing module coupled to each buffer of said plurality of transmitter queuing buffers and to each link of said plurality of links, for directing said cells stored in each buffer in a predetermined order to a corresponding link of said plurality of links.

2. The system according to claim 1, wherein said network is an Asynchronous Transfer Mode (ATM) network.

3. The system according to claim 1, wherein said network is a Frame Relay network.

4. The system according to claim 1, wherein said transmitter switch receives a virtual connection setup request and assigns at least one virtual connection corresponding to said virtual connection setup request alternatively to each buffer of said plurality of transmitter queuing buffers.

5. The system according to claim 4, wherein said at least one virtual connection is associated with said cells transmitted along each link of said plurality of links.

6. The system according to claim 5, wherein said transmitter classifier module allocates said cells to each buffer of said plurality of transmitter queuing buffers based on association with said at least one virtual connection, in such a way so as to ensure that each link has a balanced load.

7. The system according to claim 4, wherein said transmitter switch assigns said at least one virtual connection to each buffer of said plurality of transmitter queuing buffers in such a way so as to ensure that each link has a balanced load.

8. The system according to claim 1, wherein each buffer of said plurality of transmitter queuing buffers includes a plurality of Quality of Service (QoS) category queues.

9. The system according to claim 1, wherein said transmitter line card further comprises a transmitter processor for monitoring each link of said plurality of links and for programming said transmitter multiplexing module to switch said distinct cells transmitted along said one link of said plurality of links to said another link when said failure is detected on said one link.

10. The system according to claim 1, wherein said receiver switch further comprises a receiver line card coupled to said second end of each link of said plurality of links.

11. The system according to claim 10, wherein said receiver line card further comprises a receiver multiplexing module coupled to each link of said plurality of links, for merging said cells received on each link of said plurality of links and a receiver classifier module coupled to said receiver multiplexing module, for classifying and outputting said cells to a plurality of receiver queuing buffers.

12. The system according to claim 11, wherein said receiver line card further comprises a receiver processor for monitoring each link of said plurality of links and for instructing said transmitter processor of said failure of said one link.

13. The system according to claim 1, wherein each cell comprises a transmission header having a virtual circuit identifier (VCI).

14. The system according to claim 1, wherein each cell comprises a transmission header having a virtual path identifier (VPI).

15. A system for protecting a network comprising:
a plurality of links located in said network;
a transmitter switch, coupled to a first end of each link of said plurality of links, for transmitting distinct data along each link of said plurality of links; and
a receiver switch, coupled to a second end of each link of said plurality of links, for receiving said distinct data from each link of said plurality of links;
wherein said distinct data transmitted along one link of said plurality of links is switched to another link of said plurality of links when a failure is detected on said one link, wherein each link of said plurality of links includes a total bandwidth and provides a guaranteed bandwidth to a user, and wherein said total bandwidth of each link of said plurality of links is greater than a sum of said guaranteed bandwidth provided by any two links of said plurality of links.

16. The system according to claim 15, wherein said transmitter switch further comprises a plurality of transmitter line cards, each transmitter line card being coupled to said first end of a corresponding link of said plurality of links.

17. The system according to claim 16, wherein said distinct data transmitted along each link of said plurality of links comprises cells.

18. The system according to claim 17, wherein each transmitter line card of said plurality of transmitter line cards further comprises a transmitter classifier module for classifying said cells transmitted along each corresponding link, a plurality of transmitter queuing buffers coupled to said classifier module for receiving and storing said cells, and a transmitter multiplexing module coupled to each buffer of said plurality of queuing buffers and to said corresponding link of said plurality of links for directing said cells stored in one buffer of said plurality of queuing buffers to said corresponding link and said cells stored in all remaining buffers of said plurality of queuing buffers to a disposal bin.

19. The system according to claim 18, wherein said transmitter switch receives a virtual connection setup request and assigns at least one virtual connection corresponding to said virtual connection setup request alternatively to each buffer of said plurality of transmitter queuing buffers.

20. The system according to claim 19, wherein said at least one virtual connection is associated with said cells transmitted along each link of said plurality of links.

21. The system according to claim 20, wherein said transmitter classifier module allocates said cells to each buffer of said plurality of transmitter queuing buffers based on association with said at least one virtual connection, in such a way so as to ensure that each link has a balanced load.

22. The system according to claim 19, wherein said transmitter switch assigns said at least one virtual connection to each buffer of said plurality of transmitter queuing buffers in such a way so as ensure that each link has a balanced load.

23. The system according to claim 18, wherein each buffer of said plurality of transmitter queuing buffers includes a plurality of Quality of Service (QoS) category queues.

24. The system according to claim 18, wherein each of said transmitter line cards further comprises a transmitter processor for monitoring each link of said plurality of links and for programming said transmitter multiplexing module to switch said cells directed to said disposal bin to said corresponding link when said failure is detected.

25. The system according to claim 18, wherein said receiver switch further comprises a plurality of receiver line cards, each receiver line card being coupled to said second end of a corresponding link of said plurality of links.

26. The system according to claim 25, wherein each receiver line card of said plurality of receiver line cards further comprises a receiver multiplexing module coupled to said second end of said corresponding link of said plurality of links for receiving said cells, and a receiver classifier module coupled to said receiver multiplexing module for classifying and outputting said cells to a plurality of receiver queuing buffers.

27. The system according to claim 26, wherein each receiver line card of said plurality of receiver cards further comprises a receiver processor for monitoring said corresponding link, for detecting a failure of said corresponding link, and for instructing said transmitter processor corresponding to said link of said failure.

28. A method for protecting a network comprising:
providing a plurality of links between a transmitter switch and a receiver switch located within said network;
transmitting distinct data from said transmitter switch on each link of said plurality of links;
switching said distinct data transmitted along one link said plurality of links to another link of said plurality of links when a failure is detected on said one link; and
receiving said distinct data to said receiver switch within said network, wherein each link of said plurality of links includes a total bandwidth and provides a guaranteed bandwidth to a user and wherein said total bandwidth of each link of said plurality of links is greater than a sum of said guaranteed bandwidth provided by any two links of said plurality of links.

29. The method according to claim 28, wherein said network is an Asynchronous Transfer Mode (ATM) network.

30. The method according to claim 28, wherein said network is a Frame Relay network.

31. The method according to claim 28, wherein said distinct data transmitted along each link of said plurality of links comprises cells.

32. The method according to claim 31, further comprising:
receiving a virtual connection setup request; and
assigning at least one virtual connection corresponding to said virtual connection setup request alternatively to each buffer of a plurality of transmitter queuing buffers in said transmitter switch.

33. The method according to claim 32, wherein said at least one virtual connection is associated with said cells transmitted along each link of said plurality of links.

34. The method according to claim 33, further comprising:
classifying said cells within said transmitter switch;
storing said cells within said plurality of transmitter queuing buffers; and
directing said cells stored in each buffer of said plurality of transmitter queuing buffers in a predetermined order to a corresponding link of said plurality of links.

35. The method according to claim 34, wherein, in said storing, said cells are alternatively stored in each buffer of said plurality of transmitter queuing buffers.

36. The method according to claim 34, further comprising, in said storing, allocating said cells to each buffer of said plurality of transmitter queuing buffers based on association with said at least one virtual connection, in such a way so as to ensure that each link has a balanced load.

37. The method according to claim 32, further comprising assigning said at least one virtual connection to each buffer of said plurality of transmitter queuing buffers in such a way so as to ensure that each link has a balanced load.

38. The method according to claim 31, further comprising:
merging said cells received on each link of said plurality of links;
classifying said cells; and
outputting said cells to a plurality of receiver queuing buffers.

39. The method according to claim 28, further comprising monitoring each link of said plurality of links for failure and programming a multiplexing module to switch said plurality of cells directed to said one link of said plurality of links to said another link when said failure is detected on said one link.

40. A transmitter switch for protecting a network comprising:
at least one input line card for receiving data in said network; and
a transmitter line card coupled to said at least one input line card;
said transmitter line card coupled to each link of a plurality of links in said network;
said transmitter line card transmitting distinct cells of data along each link of said plurality of links before a failure is detected on one link and switching said distinct cells transmitted along said one link to another link when the failure is detected on said one link, wherein said transmitter line card further comprises a transmitter classifier module for classifying said cells transmitted along said each link of said plurality of links, a plurality of transmitter queuing buffers coupled to said classifier module, for receiving and storing said cells, and a transmitter multiplexing module coupled to each buffer of said plurality of transmitter queuing buffers and to each link of said plurality of links for directing said cells stored in each buffer in a predetermined order to a corresponding link of said plurality of links.

41. The transmitter switch according to claim 40, wherein said network is an Asynchronous Transfer Mode (ATM) network.

42. The transmitter switch according to claim 40, wherein said network is a Frame Relay network.

43. The transmitter switch according to claim 40, wherein at least one virtual connection corresponding to a received virtual connection setup request is assigned alternatively to each buffer of said plurality of transmitter queuing buffers.

44. The transmitter switch according to claim 43, wherein said at least one virtual connection is associated with said cells transmitted along each link of said plurality of links.

45. The transmitter switch according to claim 44, wherein said transmitter classifier module allocates said cells to each buffer of said plurality of transmitter queuing buffers based on association with said at least one virtual connection, in such a way so as to ensure that each link has a balanced load.

46. The transmitter switch according to claim 43, wherein said at least one virtual connection is assigned to each buffer of said plurality of transmitter queuing buffers in such a way so as to ensure that each link has a balanced load.

47. The transmitter switch according to claim 40, wherein each buffer of said plurality of transmitter queuing buffers further includes a plurality of Quality of Service (QoS) category queues.

48. The transmitter switch according to claim 40, wherein said at least one transmitter line card further comprises a transmitter processor for monitoring each link of said plurality of links and for programming said transmitter multiplexing module to switch said distinct cells transmitted along said one link of said plurality of links to said another link when said failure is detected on said one link.

49. A transmitter switch for protecting a network comprising:
at least one input line card for receiving data in said network; and
a plurality of transmitter line cards coupled to said at least one input line card;
each transmitter line card being coupled to a corresponding link of a plurality of links in said network;
each transmitter line card transmitting distinct cells of said data along each link of said plurality of links before a failure is detected on one of said plurality of links and switching said distinct cells transmitted along said one link to another link when the failure is detected on said one link, wherein each transmitter line card of said plurality of transmitter line cards further comprises a transmitter classifier module for classifying said cells transmitted along said corresponding link of said plurality of links, a plurality of transmitter queuing buffers coupled to said classifier module, for receiving and storing said cells, and a transmitter multiplexing module coupled to each buffer of said plurality of transmitter queuing buffers and to said corresponding link of said plurality of links for directing said cells stored in one buffer of said plurality of queuing buffers to said corresponding link and said cells stored in all remaining buffers to a disposal bin.

50. The transmitter switch according to claim 49, wherein said network is an Asynchronous Transfer Mode (ATM) network.

51. The transmitter switch according to claim 49, wherein said network is a Frame Relay network.

52. The transmitter switch according to claim 49, wherein at least one virtual connection corresponding to a received virtual connection setup request is assigned alternatively to each buffer of said plurality of transmitter queuing buffers.

53. The transmitter switch according to claim 52, wherein said at least one virtual connection is associated with said cells transmitted along each link of said plurality of links.

54. The transmitter switch according to claim 53, wherein said transmitter classifier module allocates said cells to each buffer of said plurality of transmitter queuing buffers based on association with said at least one virtual connection, in such a way so as to ensure that each link has a balanced load.

55. The transmitter switch according to claim 52, wherein said at least one virtual connection is assigned to each buffer of said plurality of transmitter queuing buffers in such a way so as to ensure that each link has a balanced load.

56. The transmitter switch according to claim 49, wherein each buffer of said plurality of transmitter queuing buffers further includes a plurality of Quality of Service (QoS) category queues.

57. The transmitter switch according to claim 49, wherein each transmitter line card further comprises a transmitter processor for monitoring each link of said plurality of links and for programming said transmitter multiplexing module to switch said cells directed to said disposal bin to said corresponding link when said failure is detected.

58. An apparatus, comprising:
means for receiving data in a network;
means for transmitting distinct cells of said data along each link of a plurality of links in said network before a failure is detected on one of said plurality of links; and
means for switching said distinct cells transmitted along said one link to another link when the failure is detected on said one link, wherein each link of said plurality of links includes a total bandwidth and provides a guaranteed bandwidth to a user and wherein said total bandwidth of each link of said plurality of links is greater than a sum of said guaranteed bandwidth provided by any two links of said plurality of links.

59. The apparatus of claim 58, further comprising:
means for receiving a virtual connection setup request; and
means for assigning at least one virtual connection corresponding to said virtual connection setup request alternatively to each buffer of a plurality of transmitter queuing buffers.

60. The apparatus of claim 59, further comprising means for assigning said at least one virtual connection to each buffer of said plurality of transmitter queuing buffers in such a way so as to ensure that each link has a balanced load.

61. The apparatus of claim 59, wherein said at least one virtual connection is associated to said cells transmitted along each link of said plurality of links, and wherein the apparatus further comprises:
means for classifying said cells;
means for storing said cells within each buffer of said plurality of transmitter queuing buffers; and
means for directing said cells stored in said each buffer in a predetermined order to a corresponding link of said plurality of links.

* * * * *